United States Patent
Faytlin et al.

(10) Patent No.: US 7,015,470 B2
(45) Date of Patent: Mar. 21, 2006

(54) ACTIVE NIGHT VISION COOLING SYSTEM

(75) Inventors: Alexander B. Faytlin, Walled Lake, MI (US); Mark Moore, Canton, MI (US)

(73) Assignee: Lear Corporation, Southfield, MI (US)

( * ) Notice: Subject to any disclaimer, the term of this patent is extended or adjusted under 35 U.S.C. 154(b) by 258 days.

(21) Appl. No.: 10/604,369

(22) Filed: Jul. 15, 2003

(65) Prior Publication Data

US 2005/0012039 A1 Jan. 20, 2005

(51) Int. Cl.
*H01L 31/00* (2006.01)

(52) U.S. Cl. .................... 250/330; 454/184

(58) Field of Classification Search .......... 250/330, 250/334, 335, 336.1; 454/184; 701/300; 359/353, 354; 348/148
See application file for complete search history.

(56) References Cited

U.S. PATENT DOCUMENTS

| | | | | |
|---|---|---|---|---|
| 3,751,166 A | * | 8/1973 | Starkey et al. | 356/5.04 |
| 5,614,714 A | * | 3/1997 | Shaffer | 250/334 |
| 5,737,119 A | * | 4/1998 | Mladjan et al. | 359/353 |
| 6,110,758 A | * | 8/2000 | Estrera et al. | 438/93 |
| 6,303,411 B1 | * | 10/2001 | Camm et al. | 438/149 |
| 2004/0170017 A1 | * | 9/2004 | Zhan et al. | 362/240 |

* cited by examiner

*Primary Examiner*—David Porta
*Assistant Examiner*—Faye Polyzos
(74) *Attorney, Agent, or Firm*—Earl J. LaFontaine

(57) ABSTRACT

A thermal control system (11) for a light source (46) of a vision system (10) includes a cooling assembly (61) that has a cooling device (62) and is thermally coupled to the light source (46). A thermal sensor (60) is thermally coupled to the light source (46) and generates a light source temperature signal. A control circuit (50) is coupled to the cooling assembly (61) and to the thermal sensor (60) and operates the cooling device (62) when the light source temperature signal is above a minimum temperature limit.

22 Claims, 5 Drawing Sheets

ACTIVE NIGHT VISION COOLING SYSTEM

BACKGROUND OF INVENTION

The present invention relates to night vision systems, and more particularly, to a system and method of thermally controlling the operating range of a light source of an active night vision system.

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from objects within a particular environment. Active systems utilize a light source to illuminate a target area and subsequently detect infrared light reflected off objects within that area.

Passive systems typically use far-infrared cameras characterized by low resolution and a relatively narrow field-of-view. Such cameras must be located on the vehicle exterior in order to acquire requisite infrared energy in the operating environment. Externally mounted cameras can negatively affect vehicle styling. Far-infrared cameras are also costly to manufacture and generate images that have poor contrast, which can be difficult to interpret.

Active systems provide improved resolution and image clarity over passive systems. Active systems utilize laser or incandescent light sources to generate an illumination beam having near infrared light energy, and charged coupled devices or CMOS cameras to detect reflected infrared light. Active systems commonly deploy a light source external to the vehicle so as to transmit a significant amount of light energy and provide a bright scene for imaging.

Diode lasers are preferred over incandescent light sources for several reasons. Incandescent light sources are not monochromatic like diode lasers, but instead emit energy across a large spectrum, which must be filtered to prevent glare onto oncoming vehicles. Filtering a significant portion of energy from a bulb is expensive, energy inefficient, and generates undesired thermal energy. Also, filter positioning is limited in incandescent applications, since the filter must be located proximate an associated light source. As well, multiple incandescent sources are often required to provide requisite illumination, thus increasing complexity and costs.

Exterior mounted light sources or cameras are undesirable due to risk of damage during a vehicle collision. Night vision components are relatively expensive and, as a result, protection of the components is desired. Also, exterior mounted light sources and cameras are susceptible to theft. Additionally, external mounting of sources and cameras can limit and compromise vehicle design and styling, can be esthetically displeasing, and can increase exposure of the devices to dust and debris. Exposure to dust and debris negatively effects performance of the sources and cameras. When the sources and cameras are dirty, light transmission and reception can be substantially reduced, compromising system performance.

Exterior mounted illumination sources have additional associated disadvantages. A significant disadvantage is controlling the wavelength of the illumination beam. Night vision systems have a preferred wavelength operating range. When a night vision system is operated outside this range the received illumination decreases negatively, affecting image quality of the active night vision system.

The diode laser emission wavelength is sensitive to change in temperature, such that the wavelength of a diode laser output shifts approximately 0.25 nm for every one-degree Celsius temperature change. Since external temperatures vary considerably, it is difficult to control the temperature of a diode laser. Also, when mounted externally, a risk of exposure to water exists, which can render the laser inoperable. Sealing and housing problems due to thermal energy management may also arise when weatherproofing diode lasers.

Furthermore, in designing a vehicle exterior, the external light source may have to be customized to satisfy styling requirements. Thus it is difficult to achieve commonality for light sources between different vehicles. Designing different light sources for different vehicles is costly.

Thus, there exists a need for an improved active night vision system that maintains the desired wavelength operating range of the light source while minimizing system size and maximizing optical and thermal efficiency of a light source and corresponding circuitry contained therein.

SUMMARY OF INVENTION

The present invention provides a thermal control system for a light source of an active night vision system of a vehicle. A thermal control system for a light source of a vision system includes a cooling assembly that has a cooling device and is thermally coupled to the light source. A thermal sensor is thermally coupled to the light source and generates a light source temperature signal. A control circuit is coupled to the cooling assembly and to the thermal sensor and operates the cooling device when the light source temperature signal is above a minimum temperature limit.

One of several advantages of the present invention is that it provides a thermal system for a light source of a vision system that maintains a desired operating range of the light source. In so doing, the present invention accurately maintains desired illumination wavelength of the light source and increases reliability of the light source.

Another advantage of the present invention is that it minimizes operating noise generated by the cooling system and efficiently adjusts the temperature of the light source.

Furthermore, the present invention maximizes the life span of cooling devices contained within the thermal control system through adjustment of cooling device cycle time.

Moreover, the present invention is designed such that it may be utilized within an interior cabin of a vehicle. Interior cabin use allows for easier temperature control of the light source and minimizes risk of exposure to water or condensation on the light source.

Yet another advantage of the present invention is that it provides a thermal control system that is compact in design and may be located in various locations within an interior cabin of a vehicle.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
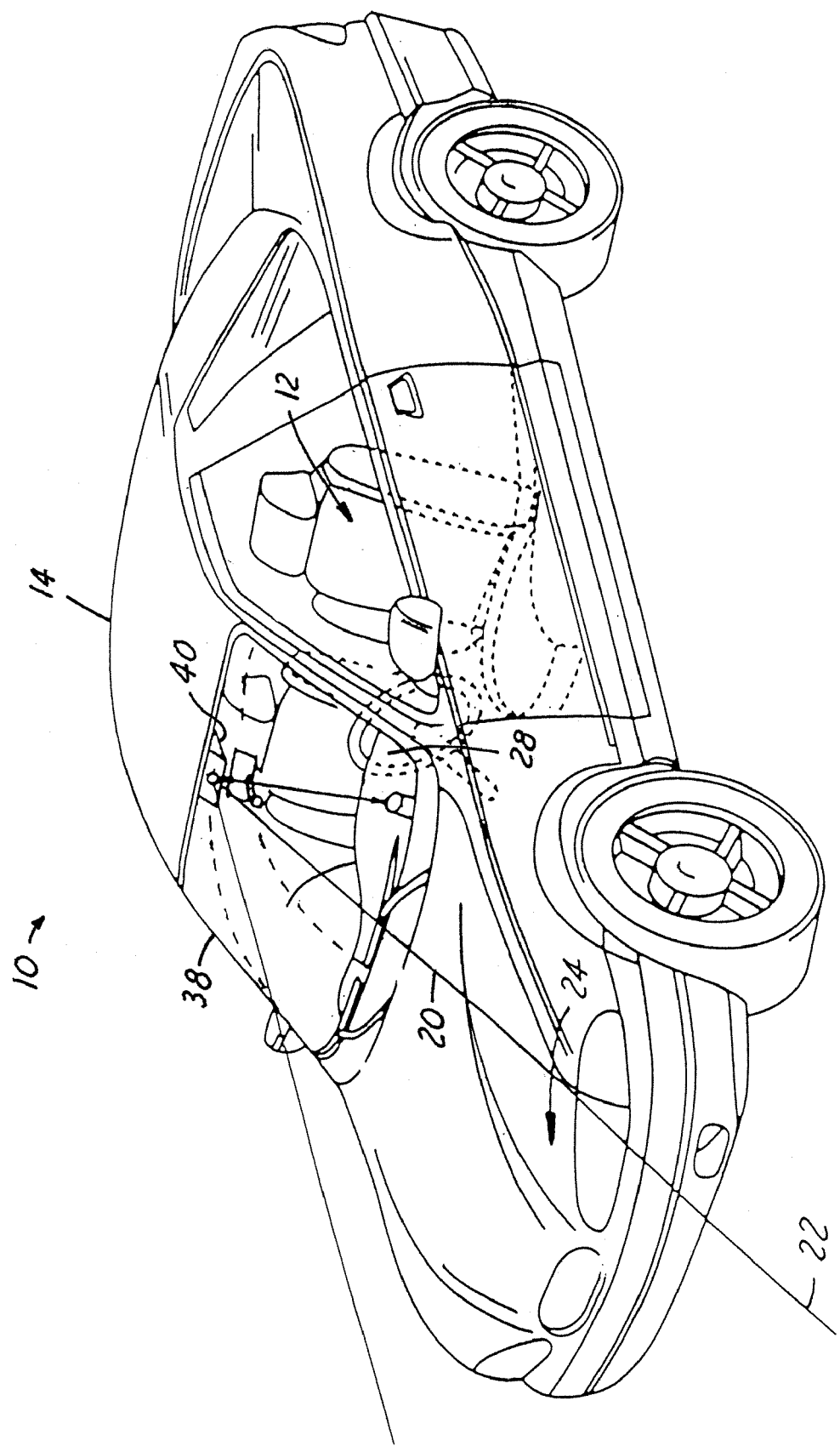
FIG. 1 is a front perspective view of an active night vision system utilizing a thermal control system in accordance with an embodiment of the present invention.

In the following figures the same reference numerals will be used to refer to the same components. While the present invention is described with respect to a system and method of thermally controlling the operating range of a light source of an active night vision system, the present invention may be applied in various applications where near infrared imaging is desired, such as in adaptive cruise control applications, collision avoidance and countermeasure systems, and in image processing systems. The present invention may be applied during day-time hours or at night. The present invention may be applied in various types and styles of vehicles as well as in non-vehicle applications.

Also, although the present invention is described with respect an illumination system that is configured to be mounted within an overhead console of a vehicle, the present invention may be applied to light sources within or exterior to an interior cabin of a vehicle, as well as to other light sources.

Additionally, in the following description the term "near infrared light" refers to light having wavelengths within the infrared light spectrum (750 nm to 1000 nm) and light having wavelengths near or just outside of the infrared light spectrum. The term also includes at least the spectrum of light output by the particular laser diode source disclosed herein.

In the following description, various operating parameters and components are described for one constructed embodiment. These specific parameters and components are included as examples and are not meant to be limiting.

Figure 2:
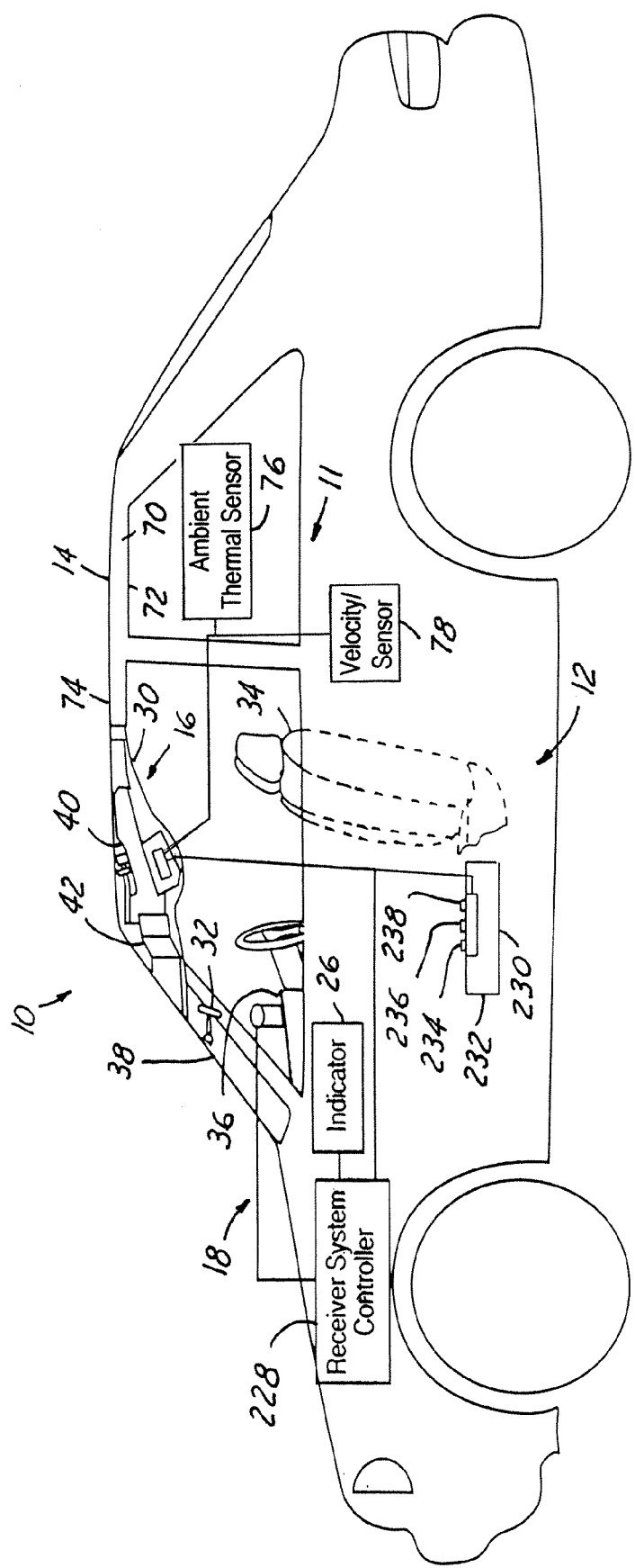
FIG. 2 is a side perspective and block diagrammatic view of the active night vision system utilizing the thermal control system in accordance with an embodiment of the present invention.

Referring now to FIGS. 1 and 2, front and side perspective views of an active night vision system 10 utilizing a thermal control system 11 in accordance with an embodiment of the present invention are shown. The vision system 10 is configured for an interior passenger cabin 12 of a vehicle 14. The vision system 10 includes an illumination system 16 and a receiver system 18. The illumination system 16 generates an illumination beam 20 having a beam pattern 22, which is directed towards a target area 24 that is forward of the vehicle 10. Portions of the illumination beam 20 are reflected off objects (not shown) within the target area 24 and are received by the receiver system 18. The receiver system 18 indicates to vehicle occupants, via an indicator 26, detection of the objects in response to reflected portions of the illumination beam 20. The thermal control system 11 thermally controls the operating range of the illumination system 16.

The illumination system 16 is configured to be mounted within an overhead console 30 above a rearview mirror 32, and the receiver system 16 is configured to be mounted forward of a driver seat 34 on a dashboard 36. Of course, the illumination system 16 and receiver system 18 may be mounted in other locations around windshield 38 as well as other window and non-window locations within the vehicle 14.

Figure 3:
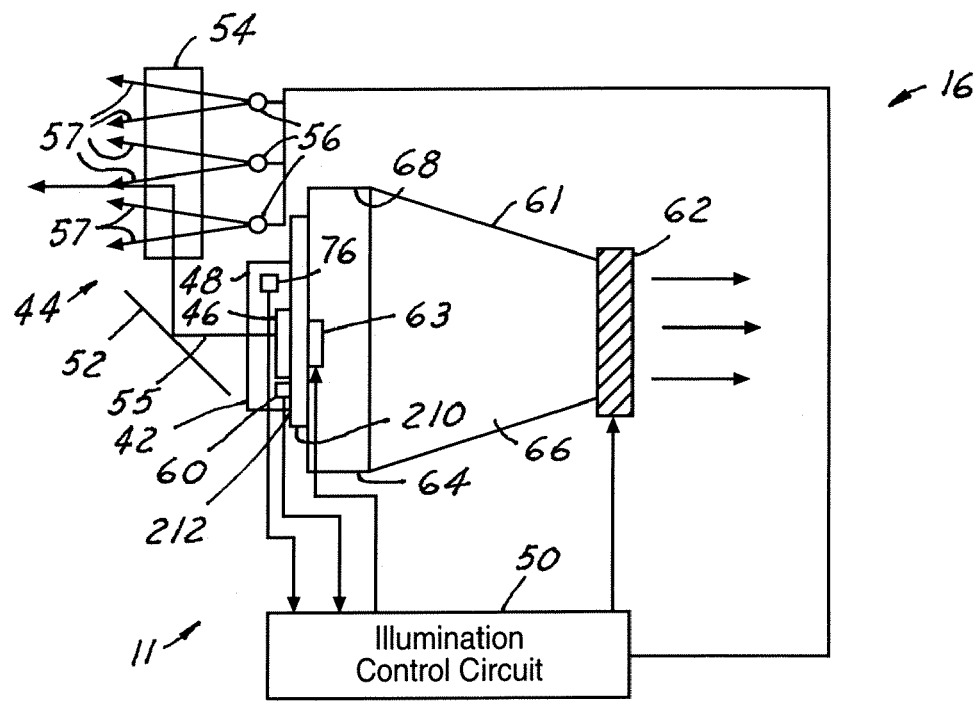
FIG. 3 is a block diagrammatic view of an illuminator system utilizing the thermal control system in accordance with an embodiment of the present invention.

Referring also to FIG. 3, a block diagrammatic view of the illuminator system 16 utilizing the thermal control system 11 in accordance with an embodiment of the present invention is shown. The illumination system 16 includes an illuminator assembly 40 and the thermal control system 11.

The illuminator assembly 40 includes a light source assembly 42 that generates light, which may be emitted from the assembly 42 in the form of an illumination beam, such as beam 20. Light generated from the light assembly 42 is directed through an optic assembly 44 where it is collimated to generate the illumination pattern 22. The illumination beam 20 is emitted from the light assembly 42 and passed through the windshield 38. The light assembly 42 includes a light source 46 that is contained within a light source housing 48. The light source 46 also receives an illumination signal from the illumination control circuit 50. The intensity of the illumination beam 20 is directly proportional to the current of the illumination signal.

The light source 46 may be of various type and style. In one embodiment of the present invention the light source 46 is a near infrared diode laser, having desired monochromatic and illumination characteristics. The diode laser may, for example, be a Single Stripe Diode Laser, Model No. S-81-3000-C-200-H manufactured by Coherent, Inc. of Santa Clara, Calif.

The optical system 44 includes the light assembly 42, a light coupler 52, and a beam-forming optic 54. Light from the light source 46, represented by arrow 55, is emitted towards and is reflected by the light coupler 52 to the optic 54, where it is again reflected towards and through the windshield 38. The light coupler 52 and the optic 54 may be contained within a component alignment maintaining module or housing (not shown). The optical system 44 may also include a series of light emitting diodes (LEDs) 56 or the like for performing color mitigation and for adjusting perceived color of the illumination beam 20 as it is emitted from the illuminator assembly 16. Light emitted by the LEDs 56 is represented by arrows 57.

The light coupler 52 may be in the form of a mirror, as shown, a series of mirrors, a fiber optic cable, or other reflective or light transporting device known in the art. In the embodiment as described, light is emitted from the light source 46 in the form of an elliptically shaped beam with a spread angle of approximately 20–50°, which is then reflected at approximately a 90° angle by the light coupler 52 to enter the optic 54. Although, the present invention is described with respect to the incorporated use of a light coupler 52, the present invention may be modified to have direct emission of light between the light source 46 and the optic 54, without use of a light coupler 52.

Although, the optic 54 is preferably a thin sheet optical element, it may be in some other form. Continuing from the above-described embodiment, the optic 54 expands and reflects the light generated by the light source 46 at approximately a 90° angle to direct the light forward of the vehicle 14. Light from the light source 46 enters and is reflected and/or collimated by the optic 54, and is then reflected and emitted through the windshield 38. Also, although a single optic is shown, additional optics may be incorporated within the illumination system 16 to form a desired beam pattern onto a target external from the vehicle 14.

The optic 54 may be formed of plastic, acrylic, or of some other similar material known in the art. The optic 54 can utilize the principle of total internal reflection (TIR) and form the desired beam pattern with series of stepped facets. An example of a suitable optical element is disclosed in U.S. patent application Ser. No. 09/688,982 entitled "Thin-Sheet Collimation Optics For Diode Laser Illumination Systems For Use In Night-Vision And Exterior Lighting Applications."

The light source assembly 42 may also include a heater 63, which may be contained within the light source housing 48. In the embodiment as shown, the heater 63 is external and separate from the housing 48. The heater 63 may be utilized in conjunction with the thermal sensor 60 in controlling the temperature of the light source 46, during cold starts of the vehicle 14 or when the temperature of the light source 46 is below a maximum temperature limit. The maximum temperature limit refers to a maximum temperature for operation of the heater 63, the heater may be operated at any temperature less than or equal to the maximum temperature limit. The heater 63 increases the temperature of the light source 46 in response to a temperature signal generated by the thermal sensor 60.

The thermal control system 11 includes a light source thermal sensor 60, a cooling assembly 61 that has a cooling device 62, and the control circuit 50. The cooling device 62 is in operative response to the thermal sensor 60, via the control circuit 50, as is described in further detail below. A heat sink 64 is provided and allows thermal energy transfer between the light assembly 42 and the cooling assembly 61. Thermal energy is absorbed by the heat sink 64 from the light assembly 42 and is radiated into the cooling assembly 61. The cooling device 62 is in thermal communication with the heat sink 64, via an air sleeve 66. The thermal system 11 circulates air around a perimeter 68 of the heat sink 64 and disperses thermal energy from the heat sink 64 into an air gap 70 between a headliner 72 and a roof 74 of the vehicle 14, thereby cooling the heat sink 64 and thus the light assembly 42 and light source 46. By having the thermal system 11 within the illumination system 16, the temperature of the light source 46 may be controlled without adjusting the temperature within the interior cabin 12. The thermal system 11 also includes an ambient temperature sensor 76 and a velocity sensor 78, which are described in further detail below.

The light sensor 60 is thermally coupled to and senses the temperature of the light source 46 and may be in the form of a thermistor or other temperature-sensing device known in the art. The light sensor 60 may be part of the light assembly 42 and located within the light housing 48, as shown, or may be separate component therefrom.

Although, the cooling device 62 may be in the form of a cooling fan, as shown, the cooling device may be in some other form known in the art. The cooling device 62 may, for example, be in the form of an air-conditioning system or be in the form of a refrigeration type system or circuit having a refrigerant contained therein. As another example, the cooling device 62 may be as simple as an air vent allowing air to circulate and cool the light assembly 42.

Figure 4:
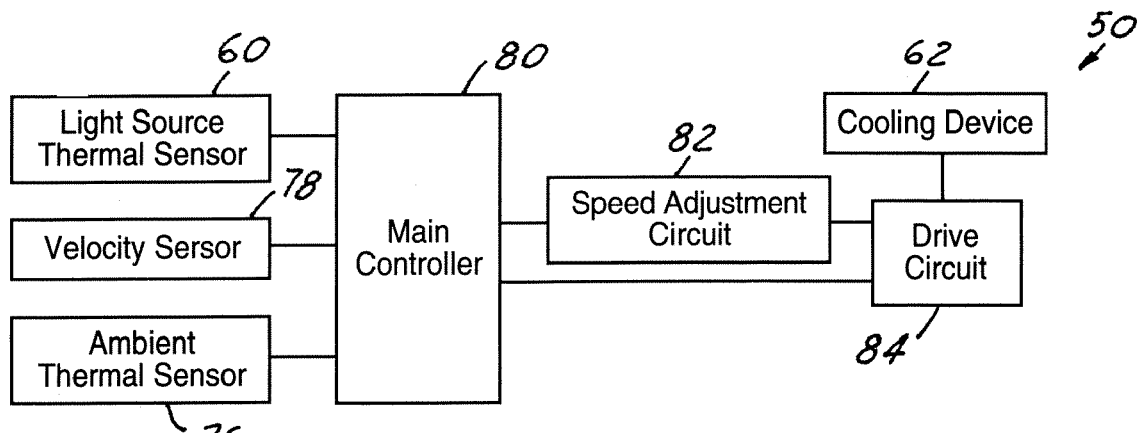
FIG. 4 is a block diagrammatic view of a control circuit of the thermal control system in accordance with an embodiment of the present invention.
Figure 5:
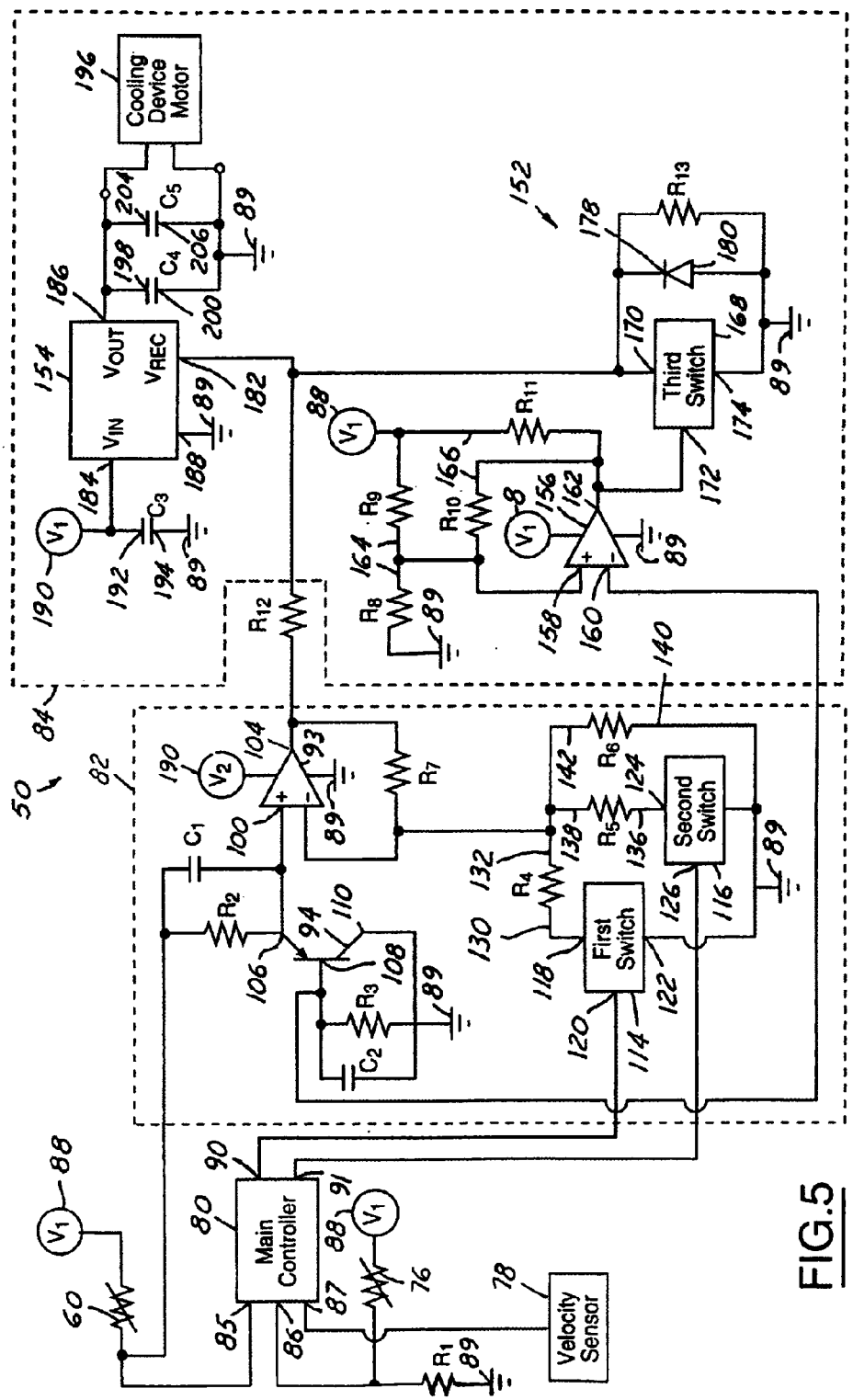
FIG. 5 is a schematic diagram of the control circuit of the thermal control system in accordance with an embodiment of the present invention.

Referring now to FIGS. 4 and 5, a block diagrammatic view and a schematic diagram of the control circuit 50 in accordance with an embodiment of the present invention are shown. The control circuit 50 includes a main controller 80 that is coupled to a speed adjustment circuit 82 and a drive circuit 84. The controller 80 adjusts rotational speed of the cooling device 62 by adjusting the voltage output of the control circuit 50, via the speed adjustment circuit 82. The drive circuit 84 provides increased current or power output to drive the light source 46 as well as provides activation and deactivation limits that pertain to when the cooling device 62 is operating in an "ON" state. The activation and deactivation limits are predetermined values that correspond directly to the temperature of the light source 46.

The controller 80 is coupled to the light sensor 60, to the ambient sensor 76, and to the velocity sensor 78, via a thermal sensor input 85, an ambient sensor input 86, and a velocity sensor input 87. The light sensor 60 and the ambient sensor receive power from a first power source 88. A first resistor $R_1$ is coupled to the ambient input 86 and to a ground terminal 89.

The controller 80 maintains the light source 46 within a predetermined temperature range by adjusting the rotational speed of the cooling device 62. The controller 80 has a first adjustment output 90 and a second adjustment output 91, which are used to adjust the gain of the speed adjustment circuit 82. Values of the outputs 90 and 91 are determined in response to the temperature of the light source 46, traveling speed of the vehicle 14, and the ambient or interior cabin temperature surrounding the light source 46 using the sensors 60, 76, and 78, respectively. The outputs 90 and 91 may be determined using look-up tables stored within or utilized by the controller 80.

The controller 80 compensates for increases in the ambient temperature around the light source 46, by also adjusting speed of the cooling device 62, but when the ambient temperature within the cabin 12 is maintained within a relatively constant temperature range, the ambient temperature has little effect on rotational speed of the cooling device 62.

In general, as the speed of the vehicle 14 increases, the noise level within the vehicle also increases. Thus, as the speed of the vehicle 14 increases, the controller 80 may increase the rotational speed of the cooling device 62 and noise generated from the cooling device 62 is undetected or heard by vehicle occupants due to the existence of exterior noise entering the vehicle 14. This is desirable, since as the speed of the vehicle 14 increases; it may be desirable to increase the intensity of the light source 46, which inherently increases the temperature of the light source 46 resulting in a desire to increase the speed of the cooling device 62. Therefore, when the light source 46 is emitting a high intensity illumination beam, the cooling device 62 may be rotated at a high speed so as to provide appropriate cooling of the light source 46, and noise generated from rotation of the cooling device 62 is undetected and therefore not perceived as an annoyance by the vehicle occupants.

The controller 80 is preferably microprocessor based such as a computer having a central processing unit, memory (RAM and/or ROM), and associated input and output buses. The controller 80 may be an application-specific integrated circuit or may be formed of other logic devices known in the art. The controller 80 may be a portion of a central vehicle main control unit, an interactive vehicle dynamics module, a restraints control module, a main safety controller, may be combined into a single integrated controller, or may be a stand-alone controller as shown.

The speed adjustment circuit 82 includes an amplification circuit 92 that has an operational amplifier 93 and a first transistor 94, which is in an emitter-follower configuration.

The amplifier 93 has a non-inverting input terminal 100, an inverting input terminal 102, and an output terminal 104. The transistor 94 has an emitter 106, a base 108, and a collector 110. A second resistor $R_2$ and a first capacitor $C_1$ are in parallel with each other. The second resistor $R_2$ and the first capacitor $C_1$ are coupled between the thermal input 85 and the non-inverting input 100, which is coupled to the emitter 106. A third resistor $R_3$ and a second capacitor $C_2$ are also coupled in parallel with each other and are coupled between the base 108 and a ground terminal 89. The collector 110 is coupled to the ground terminal 89. The second resistor $R_2$ and the third resistor $R_3$ provide a 1:1 ratio between the emitter 106 and base 108, such that voltage across resistor $R_2$ is approximately equal to voltage across resistor $R_3$ or voltage at the base 108.

The speed adjustment circuit 82 also includes a first switch 114 and a second switch 116. The first switch 114 has a collector 118, a base 120, and an emitter 122, which are coupled to a fourth resistor $R_4$, the first adjustment 90, and the ground 89, respectively. The second switch 116 also has a collector 124, a base 126, and an emitter 128 that are coupled to a fifth resistor $R_5$, the second adjustment 91, and the ground 89, respectively. The fourth resistor $R_4$ has a first end 130 that is coupled to the collector 118 and a second end 132, which is coupled to the inverting input 102. Similarly, the fifth resistor $R_5$ has a first end 136 that is coupled to the collector 124 and a second end 138, which is coupled to the inverting input 102. The emitters 122 and 128 are coupled to the ground 89. A sixth resistor $R_6$ has a first end 140 that is coupled to the ground 89 and a second end 142 that is coupled to the inverting input 102. A seventh resistor $R_7$ exists across the amplifier 93 and is coupled to the inverting input 102 and to the output 104. Resistors $R_4$, $R_5$, $R_6$, and $R_7$, in the described embodiment of FIG. 5, have approximately equal resistance.

The gain G of the speed adjustment circuit 82 or in other words the gain of the amplifier 93, may be represented by equation 1, where $R_{total}$ is the resulting combined parallel resistance of resistors $R_4$, $R_5$, and $R_6$, depending upon activation of the switches.

$$G = \frac{R_7}{R_{total}} + 1 \quad (1)$$

For example, when both switches 114 and 116 are deactivated $R_{total}$ equals resistance of resistor $R_6$ and the gain is approximately equal to one. When the first switch 114 is activated and the second switch 116 is deactivated $R_{total}$ is equal to a parallel equivalent resistance of resistor $R_4$ in parallel with resistor $R_6$. When the second switch 116 is activated and the first switch 114 is deactivated $R_{total}$ is equal to a parallel equivalent resistance of resistor $R_5$ in parallel with resistor $R_6$. When both the first switch 114 and the second switch 116 are activated $R_{total}$ is equal to a parallel equivalence of resistors $R_4$, $R_5$, and $R_6$.

The drive circuit 84 includes a comparator circuit 150, a switching circuit 152, and a voltage trigger 154. The comparator circuit 150 includes a second operational amplifier 156 also having a non-inverting input 158, an inverting input 160, and an output 162. Resistors $R_8$ and $R_9$ are in series with each other, coupled between the source 88 and the ground 89, and perform as a voltage divider. Resistor common ends 164 of the resistors $R_7$ and $R_8$ are each coupled to the non-inverting input 158. The resistors $R_8$ and $R_9$ provide a reference voltage for the comparator 150. The inverting input is coupled to the base. Resistors $R_{10}$ and $R_{11}$ are coupled in series and between the source 88 and the non-inverting input 158. Resistor common ends 166 of the resistors $R_{10}$ and $R_{11}$ are each coupled to the output 162.

In one embodiment of the present invention, the output voltage of the comparator 150 is either in a high or low state depending upon whether voltage of the base 108 is greater than the reference voltage at ends 164, such that when the temperature of the light source 46 is above a predetermined temperature that corresponds with the reference voltage, the comparator 150 activates the switching circuit 152 and in turn triggering the cooling device 62.

The switching circuit 152 includes a third switch 168 that has a collector 170, a base 172, and an emitter 174. A separation resistor $R_{12}$ exists between the collector 170 and the output 104 of the first amplifier 104. The base 172 is coupled to the output 162 of the second amplifier 156. The emitter 174 is coupled to the ground 89. A diode 176 has a cathode terminal 178 and an anode terminal 180 that are coupled to the collector 170 and the emitter 174, respectively. Resistor $R_{13}$ is coupled in parallel with the diode 176 and to the collector 170 and the emitter 174. The diode 176 may be replaced by a capacitor. The diode 176 and the resistor $R_{13}$ allow for dissipation of flyback current and are used for transient prevention within the drive circuit 84.

The third switch 168 operates in a normally closed state, such that the voltage at the collector 170 and received by the voltage trigger 154, at reference terminal 182, is shorted to ground 89, and thus the cooling device 62 is in an "OFF" state. When the temperature of the light source 46 increases above a minimum temperature limit, the comparator 150 activates or opens the third switch 168 and voltage at the first amplifier output 104 is received by the reference terminal 182. The minimum temperature limit refers to a minimum temperature as to when the cooling device 62 may be activated, and is described in further detail below.

The switches 114, 116, and 168 maybe of various form. As one possible example, the switches 114, 116, and 168 may be switches from Leshan Radio Company, Ltd and having model No. MUN2212T1.

The voltage trigger 154 includes a source voltage terminal 184, the reference terminal 182, an output voltage terminal 186, and a ground terminal 188. The source terminal 184 is coupled to a second voltage source 190 and a third capacitor $C_3$. The third capacitor $C_3$ has a positive terminal 192 and a negative terminal 194. The positive terminal 192 is coupled to the source input 184 and to the source 190 and the negative terminal 194 is coupled to the ground 89. The reference terminal 182 is coupled to the separation resistor $R_{12}$ and to the third switch collector 170. The output terminal 186 is coupled to and supplies power to a cooling device motor 196. A fourth capacitor $C_4$ has a negative terminal 198 that is coupled to the output 186 and a positive terminal 200, which is coupled to the ground 89. A fifth capacitor $C_5$ has a positive terminal 204 that is coupled to the output 186 and a negative terminal 206 that is coupled to the ground 89.

The capacitors $C_1$–$C_5$ filter noise at corresponding locations within the control circuit 50. The capacitors $C_1$–$C_5$ may be of various type, size, and have various corresponding capacitance values.

The control circuit 50, in using the speed adjustment circuit 82, provides proportional speed control of the cooling device 62 in response to changes in the temperature of the light source 46, changes in ambient temperature, and changes in velocity of the vehicle 14.

Referring again to FIG. 3, the heat sink 64 may be of various size, type, and style known in the art. The heat sink 64 includes a thermal coupler layer 210 that covers a forward surface 212 of the heat sink 64 that resides between the heat sink 64 and the light source 46. The thermal coupler layer 210 provides an efficient thermal transport between the light source 46 and the heat sink 64. The thermal coupler layer 210 may be formed of indium or of some other material having similar thermal properties.

The ambient sensor 76, like light sensor 60, may be in the form of a thermistor or other temperature-sensing device known in the art. The ambient sensor 76 may be part of the light assembly 42 and may be located within the light housing 48, as shown, or may be a separate component therefrom.

The velocity sensor 78 may be of various forms, such as a transmission rotation sensor, a wheel speed sensor, an optical sensor, or other velocity sensor known in the art. The velocity sensor 78 determines the traveling speed of the vehicle 14 and generates a velocity signal.

Figure 6:
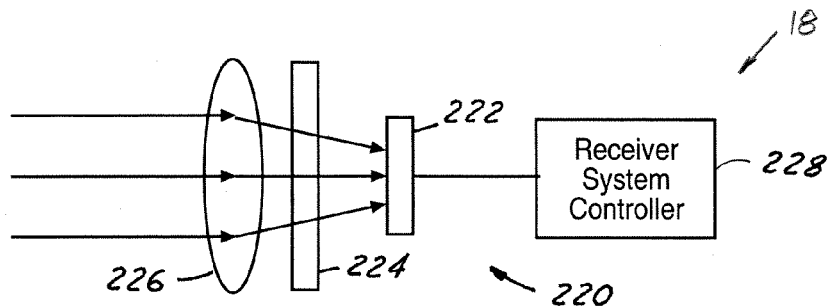
FIG. 6 is a block diagrammatic view of a receiver system in accordance with an embodiment of the present invention.

Referring now to FIG. 6, a block diagrammatic view of the receiver system 18 in accordance with an embodiment of the present invention is shown. The receiver system 18 includes a receiver assembly 220 having a receiver 222, a filter 224, a lens 226, and a receiver system controller 228. The receiver 222 may be in the form of a charge-coupled device (CCD) camera or a complementary metal oxide semiconductor (CMOS) camera. A CCD camera, Model No. Wat902HS manufactured from Watec America Corporation of Las Vegas, Nev. may, for example, be used as the receiver 222. Near infrared light reflected off objects is received by the receiver 222 to generate an image signal. The filter 224 is used to filter the reflected near infrared light. The filter 224 may be an optical band-pass filter, which allows light within a near infrared light spectrum to be received by the receiver 222, which preferably corresponds with wavelength of light contained within the illumination signal 20. The filter 224 may be separate from the lens 226 and the receiver 222, as shown, or may be in the form of a coating on the lens 226 or a lens of the receiver 222. The filter may be a digital or analog filter located within the receiver 222.

Referring again to FIGS. 2, 3, and 6 the main controller 80 controls operation of the light source 46 and the control circuit 50 whereas the receiver controller 228 controls operation of the receiver 222 and the filter 224. The controllers 80 and 228 may be coupled to vision system controls 230, as are shown in FIG. 2, which are mounted on a center console 232. The system controls 230 may include an activation switch 234, a light coupler position adjuster control 236, and an illumination beam brightness control 238.

The activation switch 234 may be used to activate the vision system 10 manually or the vision system 10 may be internally activated by one of the controllers 80 or 228. The light coupler control 236 may be coupled to a light coupler motor (not shown) for adjusting alignment angles of the light coupler 52 relative to the light source 46 and the optic 54. The brightness control 238 may be used for adjusting illumination beam 20 intensity, which in turn adjusts indication signal brightness or clarity on the indicator 26.

The indicator 26 may include a video system, an audio system, an LED, a light, global positioning system, a heads-up display, a headlight, a taillight, a display system, a telematic system or other indicator known in the art. The indicator 26 may indicate position, range, and traveling speed relative to the vehicle, as well as other known object parameters or characteristics. Objects may include any animate or inanimate objects including pedestrians, vehicles, road signs, lane markers, and other objects known in the art.

In one embodiment of the present invention the indicator 26 is in the form of a heads-up display and the indication signal is projected to appear being forward of the vehicle 14. The indicator 26 provides a real-time image of the target area to increase the visibility of objects during relatively low visible light level conditions without having to refocus ones eyes to monitor a display screen within the interior cabin.

Figure 7:
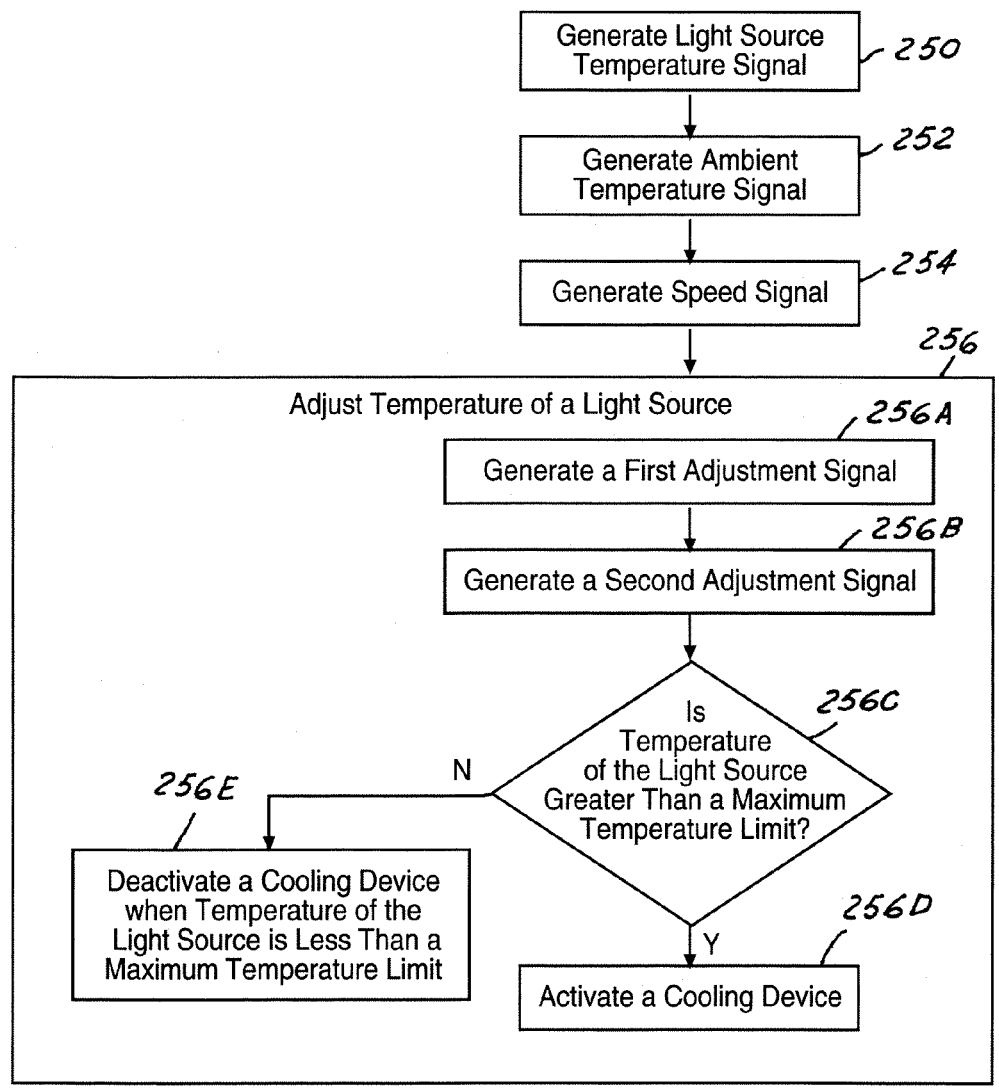
FIG. 7 is a logic flow diagram illustrating a method of thermally controlling operating range of a light source in accordance with an embodiment of the present invention.

Referring now to FIG. 7, a logic flow diagram illustrating a method of thermally controlling the operating range of the light source 46 in accordance with an embodiment of the present invention is shown. Although, the following steps are described with respect to the embodiments of FIGS. 4 and 5, they are not meant to be limited to the embodiments of FIGS. 4 and 5 and may be modified accordingly.

In step 250, the light sensor 60 generates a light source temperature signal in response to the temperature of the light source 46. In step 252, the ambient thermal sensor 76 generates an ambient temperature signal in response to the temperature of air in the interior cabin 12 around or proximate the light source 46. In step 254, the velocity sensor 78 generates a speed signal in response to the traveling speed of the vehicle 14.

In step 256, the control circuit 50 adjusts the temperature of the light source 46 in response to the light source temperature signal, the ambient temperature signal, and the speed signal. The controller 80 may operate the cooling device 62 at incremental speeds or may gradually vary speed of the cooling device 62 in response to changes in the temperature of the light source 46, ambient temperature, and vehicle velocity.

In step 256A, the controller 80 generates a first adjustment signal in response to the ambient temperature signal and the light source temperature signal. In step 256B, the controller 80 generates a second adjustment signal in response to the velocity signal and the light source temperature signal. Of course, the control circuit 50 may be modified such that the controller 80 provides a single adjustment signal that is generated in response to the light source temperature signal, the ambient temperature signal, and the velocity signal. The adjustment signals are generated, as stated above, using one or more look-up tables containing adjustment values corresponding to light source temperatures, ambient temperatures, and vehicle velocities.

In step 256C, the comparator 150 determines whether to activate the cooling device 62 by comparing the temperature of the light source 46 with the minimum temperature limit, in corresponding voltage levels. When the temperature of the light source 46 is above the minimum temperature limit the comparator 150 actives the switching circuit 152. For example, the light source 46 may have a preferred operating temperature range of approximately between 40°–55° C., a minimum temperature limit may refer to a temperature in a portion of that temperature range approximately equal to or between 52°–55° C., depending upon thermal response time of the system 10.

In step 256D, when the temperature of the light source 46 is greater than the minimum temperature limit the switching circuit is activated and the voltage trigger 154 supplies voltage to the cooling device 62 in proportion to gain level of the first amplifier 93, which is determined in response to the first adjustment signal and the second adjustment signal. The cooling device 62 is preferably activated at a relatively slow speed, such as a basic operating speed that provides a minimum level of cooling, to minimize operating noise of the cooling device 62. The basic operating speed may correspond with a current ambient temperature, such that the cooling device 62 rotates at a sufficient speed to provide the minimum level of cooling for the light source 46. As light source temperature, ambient temperature, and/or, vehicle speed increases speed of the cooling device 62 and/or rotational speed limit of the cooling device 62 may be increased.

In step 256E, when the temperature of the light source 46 is less than or equal to a lower end of a cooling device activation zone the switching circuit is deactivated or shorted to ground 89, thus deactivating the cooling device 62. For example, the activation zone may be approximately equal to 52°–55° C., wherein the cooling device 62 may be activated; the lower end may be approximately equal to 52° C.

The controller 80 may, when activating and deactivating the cooling device 62, ramp up or down the speed of the cooling device 62.

The controller 80, in order to provide increased service life of the cooling device 62, may also adjust the cycle time of the cooling device 62. For example, the cooling device 62 may provide an equivalent amount of cooling by operating the cooling device 62 at a lower speed and for a longer duration as opposed to operating the cooling device 62 at a higher speed and for a shorter duration. In so doing, the present invention minimizes cycle time, or the number of times the cooling device 62 is activated and deactivated within a given period of time.

The controller 80 may determine in certain instances to activate the cooling device 62 at a maximum speed in order to provide a maximum amount of cooling. For example, when the temperature of the light source 46 increases quickly over a short duration of time the controller 80 may activate the cooling device 62 at a maximum speed to rapidly cool the light source 46.

The controller 80 may deactivate the light source 46 when the thermal control system 11 is operating inappropriately to protect the light source 46. When the light source 46 is deactivated the controller 80 may signal a vehicle operator an alarm signal, via the indicator 26. Also, when the temperature of the light source 46 is above a predetermined temperature level the controller 80 may deactivate the light source 46. For example, using the above stated activation zone of 52°–55° C., the controller 80 may deactivate the light source 46 when the temperature is greater than 60° C. to protect the light source 46 and in general the system 11, depending upon the type and style of the light source 46.

The above-described steps are meant to be illustrative examples; the steps may be performed sequentially, synchronously, simultaneously, or in a different order depending upon the application.

The present invention provides a thermal control system for a light source of a vision system. The present invention accurately maintains temperature of the light source and thereby also maintains accurate wavelength operating range of the light source. The present invention compensates for changes in vehicle velocity and ambient temperature of air proximate to the light source in maintaining the wavelength operating range. The present invention minimizes noise within an interior cabin of the vehicle and provides efficient cooling of the light source, while maximizing operating life of a cooling device contained therein.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A thermal control system for a light source of a vision system comprising:
   a cooling assembly having a cooling device and being thermally coupled to the light source;
   a thermal sensor thermally coupled to the light source and generating a light source temperature signal; and
   a control circuit coupled to said cooling assembly and to said thermal sensor, said control circuit operating said cooling device when said light source temperature signal is above a minimum temperature limit.

2. A system as in claim 1 wherein said cooling assembly comprises a cooling fan in thermal communication with said light source, said control circuit operating said cooling fan when said light source temperature signal is above said minimum temperature limit.

3. A system as in claim 2 wherein said cooling assembly comprises:
   a heat sink thermally coupled to said light source; and
   an air sleeve thermally coupled to said heat sink and said cooling fan;
   said control circuit operating said cooling fan to circulate air across said heat sink.

4. A system as in claim 2 wherein said control circuit increases a rotational speed limit of said cooling fan when speed of the vehicle increases.

5. A system as in claim 2 wherein said cooling fan has a base operating speed that corresponds with ambient temperature.

6. A system as in claim 2 wherein said control circuit operates said cooling fan at a maximum speed when temperature of said light source increases rapidly.

7. A system as in claim 2 wherein said control circuit adjusts cycle time of said cooling fan.

8. A system as in claim 2 wherein control circuit in operating said cooling fan ramps rotational speed of said cooling fan.

9. A system as in claim 2 wherein said control circuit deactivates said cooling fan when temperature of said light source is greater than a predetermined limit.

10. A system as in claim 1 further comprising a vehicle speed sensor generating a vehicle speed signal, said control circuit operating said cooling device in response to said vehicle speed signal.

11. A system as in claim 1 further comprising an ambient temperature sensor generating an ambient temperature signal, said control circuit activating said cooling device in response to said ambient temperature signal.

12. A system as in claim 1 wherein said control circuit comprises a fan speed adjustment circuit adjusting speed of said cooling device.

13. A system as in claim 12 wherein said fan speed adjustment circuit adjusts speed of said cooling device in response to ambient temperature.

14. A system as in claim 12 wherein said fan speed adjustment circuit adjusts speed of said cooling device in response to vehicle speed.

15. A system as in claim 1 wherein said control circuit comprises a fan drive circuit.

16. A system as in claim 15 wherein said fan drive circuit comprises activates said cooling device when temperature of said light source is greater than a predetermined temperature limit.

17. A vision system of a vehicle comprising:
an illuminator assembly having a light source and generating an illumination beam;
a thermal control system having a cooling device thermally coupled to said illuminator assembly;
a receiver assembly generating an image signal in response to at least a reflected portion of said illumination beam; and
at least one controller controlling generation of said illumination beam and said image signal and thermally controlling operating range of said light source through operation and duration adjustment of said cooling device.

18. A vision system as in claim 17 wherein said thermal control system comprises a cooling fan in thermal communication with said light source, said control circuit operating said cooling fan when said temperature signal is above a minimum temperature limit.

19. A method of thermally controlling operating range of a light source of a vision system for a vehicle comprising:
generating a light source temperature signal in response to temperature of the light source; and
cooling the light source in response to said temperature signal.

20. A method as in claim 19 wherein cooling the light source is in response to said light source temperature signal and in response to speed of the vehicle.

21. A method as in claim 19 wherein cooling the light source is in response to said light source temperature signal and in response to ambient temperature.

22. A method as in claim 19 wherein cooling the light source comprises adjusting cycle time of a cooling device.

* * * * *